(12) United States Patent
Zhang et al.

(10) Patent No.: US 7,981,337 B2
(45) Date of Patent: Jul. 19, 2011

(54) USE OF AQUEOUS NAOH/THIOUREA SOLUTION IN PILOT-SCALE PRODUCTION OF CELLULOSE PRODUCTS

(75) Inventors: Lina Zhang, Wuhan (CN); Dong Ruan, Wuhan (CN); Jinping Zhou, Wuhan (CN); Ang Lv, Wuhan (CN)

(73) Assignees: Wuhan University, Wuhan, Hubei Province (CN); Jiangsu Long-Ma Green Fibers Co., Ltd., Hai'An County, Jiangsu Province (CN)

( * ) Notice: Subject to any disclaimer, the term of this patent is extended or adjusted under 35 U.S.C. 154(b) by 56 days.

(21) Appl. No.: 12/088,686

(22) PCT Filed: Apr. 21, 2006

(86) PCT No.: PCT/CN2006/000756
§ 371 (c)(1),
(2), (4) Date: Mar. 29, 2008

(87) PCT Pub. No.: WO2007/121609
PCT Pub. Date: Jan. 11, 2007

(65) Prior Publication Data
US 2008/0284054 A1 Nov. 20, 2008

(51) Int. Cl.
*C08J 3/03* (2006.01)
*C08L 1/02* (2006.01)
*D01F 2/02* (2006.01)
(52) U.S. Cl. ............ 264/203; 264/178 R; 264/187
(58) Field of Classification Search .......... 264/187, 264/196, 197, 203, 178 R
See application file for complete search history.

(56) References Cited

U.S. PATENT DOCUMENTS

| | | | |
|---|---|---|---|
| 2,179,181 A | 11/1939 | Graenacher et al. | |
| 3,236,669 A | 2/1966 | Williams | |
| 3,793,136 A * | 2/1974 | Daul et al. | 428/369 |
| 4,062,921 A * | 12/1977 | Austin | 264/233 |
| 4,246,221 A | 1/1981 | McCorsley | |
| 4,302,252 A | 11/1981 | Turbak | |
| 4,404,369 A | 9/1983 | Huttunen | |
| 5,259,743 A * | 11/1993 | Glaser | 425/66 |
| 5,290,349 A | 3/1994 | Chen | |
| 5,470,519 A * | 11/1995 | Markulin | 264/193 |

(Continued)

FOREIGN PATENT DOCUMENTS
CN 1318583 10/2001
(Continued)

OTHER PUBLICATIONS

Jie Cai et al: "Novel Fibers Prepared From Cellulose in NaOH/Urea Aqueous Solution" Macromolecular Rapid Communications, Sep. 9, 2004, vol. 25, No. 17, p. 1558-1562.*

(Continued)

*Primary Examiner* — Richard Crispino
*Assistant Examiner* — Robert Dye
(74) *Attorney, Agent, or Firm* — Workman Nydegger

(57) ABSTRACT

The present invention relates to the use of an aqueous sodium hydroxide/thiourea solution, specifically to the use of an aqueous sodium hydroxide/thiourea solution for pilot-scale production of cellulose products, wherein sodium hydroxide constitutes 8.1%-12.0% of the total weight of the aqueous solution, thiourea constitutes 3.0%-6.0% of the total weight of the aqueous solution, and said cellulose products include regenerated cellulose filaments, films, nonwovens, as well as composite fibers and/or functional materials of protein/cellulose, chitin/cellulose, Konjac Glucomannan/cellulose, nanocrystal particle/cellulose, etc.

15 Claims, 2 Drawing Sheets

U.S. PATENT DOCUMENTS 7,390,566 B2 * 6/2008 Luo et al. .................. 428/393

FOREIGN PATENT DOCUMENTS

| CN | 1358769 | 7/2002 |
|---|---|---|
| CN | 1483756 A | 3/2004 |
| CN | 1544515 | 11/2004 |
| CN | 1557864 | 12/2004 |
| CN | 1699442 | 11/2005 |
| GB | 1144048 | 3/1969 |

OTHER PUBLICATIONS

Cai et al: "Novel Fibers Prepared From Cellulose in NaOH/Urea Aqueous Solution" Macromolecular Rapid Communications, Sep. 9, 2004, vol. 25, No. 17, p. 1558-1562.*

CN1544515, English Claims Translation.*

CN1544515, English Description Translation_1-4.*

Dong Ruan et al: "Structure and properties of regenerated cellulose/tourmaline nanocrystal composite films" Journal of Polymer Science Part B: Polymer Physics, John Wiley & Sons, Inc, US, vol. 42, No. 3, Dec. 12, 2003, pp. 367-373, XP002577648.

Dong Ruan et al: "Structure and Properties of Novel Fibers Spun from Cellulose in NaOH/Thiourea Aqueous Solution" Macromolecular Bioscience, Wiley VCH Verlage, Weinheim, DE, vol. 4, No. 12, Dec. 7, 2004, pp. 1105-1112, XP002577649.

Chen X et al: "X-ray studies of regenerated cellulose fibers wet spun from cotton linter pulp in NaOH/thiourea aqueous solutions" Polymer, Elsevier Science Publishers B.V, GB LNKD-DOI:10.1016/J. Polymer 2006.02.044, vol. 47, No. 8, Apr. 5, 2006, pp. 2839-2848, XP025232082.

Yang G et al: "Microporous formation of blend membranes from cellulose/konjac glucomannan in NaOH/thiourea aqueous solution" Journal of Membrane Science, Elsevier Scientific Publ. Company, Amsterdam, NL LNKD-DOI:10.1016/S0376-7388(01)00727-X, vol. 201, No. 1-2, May 31, 2002, pp. 161-173, XP004344298.

Lina Zhang et al: "Morphology and properties of cellulose/chitin blends membranes from NaOH/thiourea aqueous solution" Journal of Applied Polymer Science, John Wiley and Sons Inc. New York, US, vol 86, No. 8, Nov. 21, 2002, pp. 2025-2032, XP002577650.

* cited by examiner

USE OF AQUEOUS NAOH/THIOUREA SOLUTION IN PILOT-SCALE PRODUCTION OF CELLULOSE PRODUCTS

FIELD OF INVENTION

The present invention relates to the use of aqueous sodium hydroxide (NaOH)/thiourea solution, specifically to the use of aqueous NaOH/thiourea solution in pilot-scale production of cellulose products, wherein said cellulose products comprise composite fibers and/or functional materials of protein/cellulose, chitin/cellulose, Konjac Glucomannan/cellulose, nano-crystal particle/cellulose, etc. The present invention pertains to the field of natural macromolecules, and also to the fields of material, textile, chemistry and chemical engineering, agriculture and environmental engineering.

BACKGROUND OF THE INVENTION

Celluloses are the most abundant renewable resource on the earth and are environmentally friendly materials, so sufficient utilization of celluloses can not only protect environment but also save the limited unrenewable petroleum resources. However, celluloses are currently far from being sufficiently utilized in chemical industry, mainly because the current processes for dissolving cellulose are complex, costly and pollutive.

In the past one hundred years, conventional viscose process has been used for producing regenerated cellulose products such as rayon, glassine paper and the like. The conventional viscose process comprises reacting cellulose with $CS_2$ (33 wt %) in the presence of strong base (the concentration of sodium hydroxide being 18 wt %) to produce cellulose xanthate that is dissolved in the alkaline solution to form a viscose solution, and then spinning or casting the viscose solution of cellulose, followed by regenerating in diluent acid solution to obtain viscose fiber (rayon) or glassine paper. A great quantity of toxic gases such as $CS_2$ and $H_2S$ which severely pollute environment are released during the process and are harmful to human health (J. Macromol. Sci.-Rev. Macromol. Chem., 1980, C18 (1), 1).

In the prior art, the cuprammonium process for producing cuprammonium rayon also has drawbacks of environmental pollution, high cost and difficulty to recover solution. The processes in which other organic or inorganic solvents such as dimethylsulfoxide-nitrogen oxide (U.S. Pat. No. 3,236,669, 1966), aqueous $ZnCl_2$ solution (U.S. Pat. No. 5,290,349, 1994), LiCl/DMAc (U.S. Pat. No. 4,302,252, 1981) and the like are used, respectively, are difficult in industrialization due to the cost and their complicated dissolving procedures.

N-methylmorpholine oxide (NMMO) (U.S. Pat. No. 2,179,181, 1939; U.K. Patent No. GB1144048, 1967; U.S. Pat. No. 4,246,221, 1981) is considered as the most promising solvent for cellulose so far. In 1989, Bureau International pour la Standardisation des Fibres Artificielles (BISFA) in Brussels named cellulose fibers made by such NMMO process as "Lyocell". Although a small amount of products of cellulose fibers made thereby had been marketed, the industrial production of them developed slowly due to high cost and high spinning temperature.

In addition, a process had been proposed that comprises reacting cellulose with urea at high temperature to obtain cellulose carbamate, and then dissolving directly in a diluent alkaline solution to obtain spinning solution (Finland Patent No. FI61003; Finland Patent No. FI62318; U.S. Pat. No. 4,404,369). However, this process requires a great amount of urea, leads to side product(s), and is difficult for industrialization either. Japan Patent No. JP1777283 disclosed that cellulose was dissolved in 2.5 mol/L aqueous NaOH solution, but only wood pulp cellulose having a polymerization degree of below 250 and being treated by vapor explosion could be used, which could be dissolved in such aqueous NaOH solution at about 4° C. The cellulose filaments made by using this process have a poor strength and are not suitable for spinning or film-forming in industry.

The present applicant proposed in Chinese Patent No. 00128162.3 that a mixed aqueous solution of 4 wt %-8 wt % sodium hydroxide and 2 wt %-8 wt % thiourea was used to, after being cooled, directly dissolve at room temperature the natural cellulose having a viscosity average molecular weight of less than $10.1 \times 10^4$ and the regenerated cellulose having a viscosity average molecular weight of less than $12 \times 10^4$ to obtain transparent cellulose solution. However, the practices indicated that the solvent system must be kept under freezing condition (−20° C.) for 3-8 hours to form an ice-like stuff and then thawed before it was used to dissolve cellulose for preparing transparent concentrated cellulose solution. Thus, it is applicable to laboratory scale only at present, and is not suitable for industrialization.

In addition, the present applicant proposed in Chinese Patent No. 200310111447.8 that a mixed aqueous solution of 8.1 wt %-12.0 wt % sodium hydroxide and 4.0 wt %-6.0 wt % thiourea was used for directly dissolving cellulose, and a process of using this mixed aqueous NaOH/thiourea solution for preparing regenerated cellulose films or fibers in laboratory scale, but this process was merely provided for research and was not suitable for industrial production.

SUMMARY OF THE INVENTION

Thus, one object of the present invention is to provide a use of aqueous sodium hydroxide/thiourea solution, wherein sodium hydroxide constitutes 8.1 wt %-12.0 wt % of the total weight of the aqueous solution, and thiourea constitutes 3.0 wt %-6.0 wt % of the total weight of the aqueous solution. Said aqueous solution is used for pilot-scale production of cellulose products, and said cellulose products comprise protein/cellulose, chitin/cellulose, Konjac Glucomannan/cellulose, nano-crystal particle/cellulose and the other composite fibers and/or functional materials.

According to the use of the present invention, when said sodium hydroxide/thiourea aqueous solution is used for pilot-scale production of cellulose products, the said use comprises the following steps:

(a) Pre-cooling a mixed aqueous solution of sodium hydroxide and thiourea to a first temperature;

(b) Placing the pre-cooled, mixed aqueous solution at a second temperature, and then immediately adding a cellulose raw material and dissolving under sufficient agitation to obtain a cellulose solution;

(c) Filtering and deaerating said cellulose solution;

(d) Using a molding device for pilot-scale production to process the filtered and deaerated cellulose solution to form a cellulose product.

According to the use of the present invention, between the step (b) and the step (c) is further comprised a step for mixing the cellulose solution with other substances, wherein said other substances comprises proteins, chitins, Konjac Glucomannan, nano-crystal particles, etc.

According to the use of the present invention, in said aqueous solution of sodium hydroxide/thiourea, the concentration of sodium hydroxide is preferably 9.0 wt %~10.0 wt %, most preferably 9.5 wt %; and the concentration of thiourea is preferably 4.0 wt % 6.0 wt %, most preferably 4.3 wt %.

According to the use of the present invention, the said first temperature is −10° C.~5° C., preferably −8° C.~0° C., most preferably −6° C.~3° C.

According to the use of the present invention, the said second temperature is environmental temperature, specifically 0° C.~25° C., preferably 5° C.~20° C., most preferably 10° C.

According to the use of the present invention, the said cellulose raw material can be various cellulose pulps including cotton linter pulp, bagasse pulp, wood pulp, etc., particularly various cellulose pulps having a polymerization degree of below 700 and a relatively narrow distribution of molecular weight, preferably a cellulose pulp having a polymerization degree of 250~650, most preferably a cellulose pulp having a polymerization degree of 300~450.

According to the use of the present invention, after the cellulose raw material is added at said second temperature, the agitation is performed sufficiently for 5 minutes or more, preferably 10 minutes or more, most preferably 15 minutes or more.

According to the use of the present invention, the concentration of the cellulose solution obtained from the step (b) is 4.0 wt %~10.0 wt %, preferably 4.5 wt %~8.0 wt %, more preferably 5.0 wt %~6.5 wt %. It is preferred that, with the increase of polymerization degree of the cellulose pulp from 250 to 650, the concentration of cellulose solution is decreased from 10 wt % to 4 wt %, and within such a range, the strength of the cellulose filaments can be enhanced by appropriately reducing molecular weight, maintaining narrow distribution of molecular weight and elevating concentration.

According to the use of the present invention, the said molding device is selected from a variety of molding devices including spinning devices, film-making devices, granulating devices, etc.

In one embodiment, the aqueous NaOH/thiourea solution is used for spinning by a wet spinning device, and in a preferred embodiment, the aqueous. NaOH/thiourea solution is used for spinning by a two-step coagulation bath spinning device.

The said two-step coagulation bath spinning device comprises a first coagulation bath and a second coagulation bath. The said first coagulation bath is a mixed aqueous solution of $H_2SO_4$ and $Na_2SO_4$, wherein the concentration of $H_2SO_4$ is 5 wt %~20 wt %, preferably 8 wt %~16 wt %, most preferably 9 wt %~13 wt %; and the concentration of $Na_2SO_4$ is 5 wt %~25 wt %, preferably 8 wt %~20 wt %, most preferably 10 wt %~15 wt %; and the bath temperature is 0~40° C., preferably 5~30° C., most preferably 10~15° C. The said second coagulation bath is 3 wt %~20 wt %, preferably 5 wt %~10 wt %, most preferably 5 wt % aqueous solution of $H_2SO_4$, and the bath temperature is 0~50° C., preferably 10~30° C., most preferably 10~20° C.

The said cellulose solution is jetted from a spinneret into the first coagulation bath for solidification, partial stretch orientation and draft, and then enters into the second coagulation bath for further regeneration and stretch orientation, and is subjected to water washing, plasticizing, drying and winding successively to obtain regenerated cellulose filaments, which may subsequently be used for manufacturing filaments, chopped fibers, nonwovens and the others. The spinneret can be vertical spinneret or horizontal spinneret.

In another embodiment, the aqueous NaOH/thiourea solution is used for producing regenerated cellulose films through a film-making device.

In still another embodiment, the aqueous NaOH/thiourea solution is used for granulation through a granulating device, and is used as chromatographic packings, etc.

According to the use of the present invention, the said cellulose products can be in the form of filaments, chopped fibers, films, chromatographic packings and/or nonwovens, etc.

The present inventors had confirmed experimentally that the aqueous NaOH/thiourea solution can dissolve chitins, proteins, Konjac Glucomannan and the like which are hardly dissoluble, and can facilitate the uniform dispersion of nanoparticles, so that it can be used advantageously for preparing composite fibers and/or functional materials of protein/cellulose, chitin/cellulose, Konjac Glucomannan/cellulose, nano-crystal particle/cellulose, etc.

Thus, in a further embodiment, aqueous NaOH/thiourea solution is used for preparing functional chitin/cellulose, protein/cellulose, nano-crystal particle/cellulose fibers, and is optionally granulated by a granulating device so as to be used as chromatographic packings and the like.

As compared to the prior art, the advantages of the present invention lie in that, firstly, the chemical raw materials used are common and less costly, which are made available as a new solvent for cellulose by cooling to a reduced temperature; secondly, a variety of high added-value cellulose products can be produced according to the present invention; thirdly, since $CS_2$ is not used in the production process, such regenerated cellulose products are free of sulfur as determined (viscose fibers have a sulfur content of 8~10 g/kg) and are regenerated cellulose materials with very high safety; fourthly, during the production according to the present invention, the production cycle is short (30~40 hours), which is equivalent to ⅓ that of viscose process; and fifthly, the process of the present invention is particularly suitable for industrial production and practical applications.

DESCRIPTION OF THE PREFERRED EMBODIMENTS

The present invention is further illustrated in detail in conjugation with the drawings and specific examples, but the present invention is not intended to be limited thereto.

Figure 1:
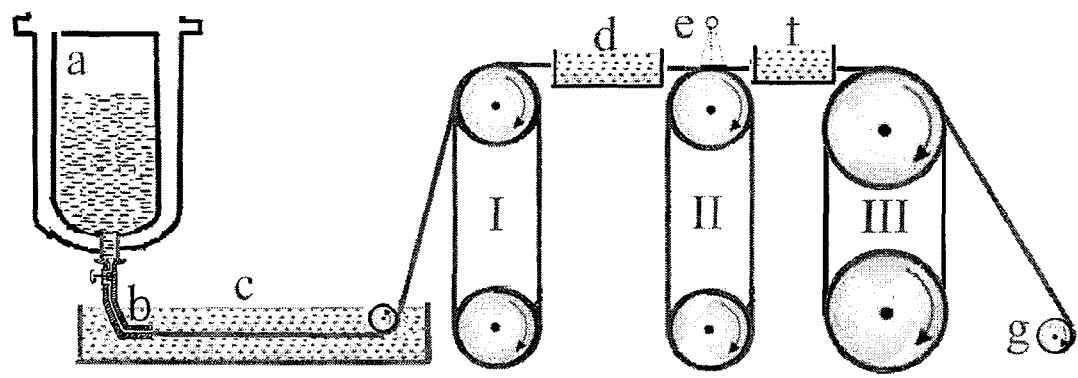
FIG. 1 shows a schematic diagram of a two-step coagulation bath spinning device according to a preferred embodiment of the present invention.

In a preferred embodiment of the present invention, a compact device for pilot-scale production (FIG. 1) according to the present invention is used for wet spinning, wherein a cellulose solution is firstly deaerated by a deaerating tank a, and then, after being jetted out through a spinneret b, enters into a first coagulation bath tank c and subsequently, a second coagulation bath tank d in tow, followed by passing through a water-washing device e, and as desired, being plasticized in a plasticizer tank f, and finally is drawn and wound by a winding device g to form a package. Preferably, the spinneret is reformed to spin downwardly (or the length/diameter ratio of the spinneret is increased) so that cellulose molecules are stretched and oriented by gravity even when they are still in solution. Meanwhile, the solidification time of cellulose is further prolonged and the stretch ratio is increased by arrangement of devices and process. Preferably, multi-stage stretch is employed to further enhance the strength of cellulose filaments, so that regenerated cellulose filaments with better mechanical properties are prepared.

Example 1

Figure 2:
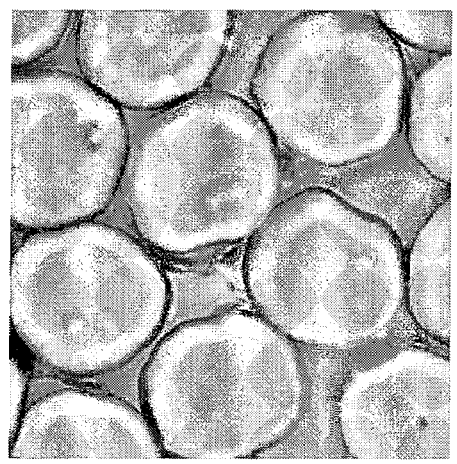
FIG. 2 shows a cross-section view of the cellulose filaments obtained according to the present invention.
Figure 3:
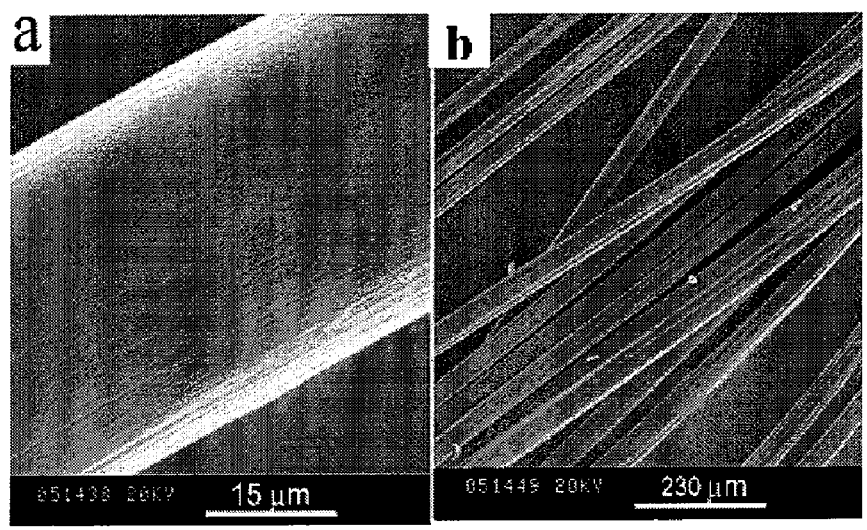
FIG. 3 shows the surface of cellulose filaments obtained according to the present invention.
Figure 4:
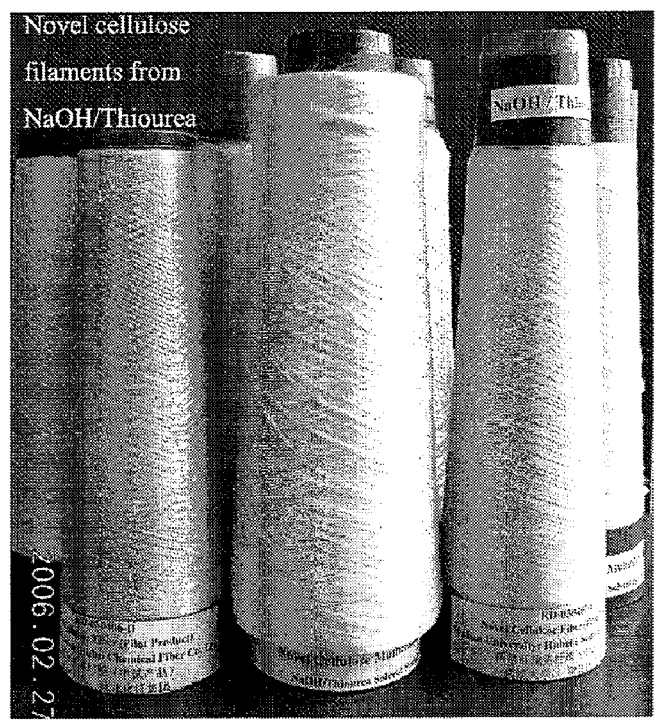
FIG. 4 shows packages of cellulose filaments obtained according to the present invention.

3 kg of a mixed aqueous solution of 9.5 wt % NaOH/4.3 wt % thiourea (analytically pure) was pre-cooled to −4.8° C., then 152 g of dry cotton linter cellulose pulp (having a polymerization degree of 620) was added immediately, while stirring under 720 rpm at room temperature for 15 minutes to dissolve the cellulose completely. A transparent cellulose solution was obtained by deaerating under vacuum at 5° C. for 12 hours. The obtained cellulose solution was pressed to pass through a spinneret and entered into a first coagulation bath for solidification, wherein the bath was a mixed aqueous solution of 15 wt % $H_2SO_4$/10 wt % $Na_2SO_4$ and the bath temperature was 10° C. Subsequently, the cellulose filaments entered into a second coagulation bath for regeneration, wherein the bath was an aqueous solution of 5 wt % $H_2SO_4$ and the bath temperature was 10° C. The stretched and regenerated cellulose filaments were washed with water and entered into a plasticizer tank for oiling, dried by a drying roll, and then wound on a bobbin to form a spindle numbered as 1. The filaments had a round cross-section (FIG. 2) similar to Lyocell, smooth surface (FIG. 3), soft and glossy appearance (FIG. 4), and were free of sulfur and possessed excellent mechanical properties (Table 1).

Example 2

3 kg of a mixed aqueous solution of 9.5 wt % NaOH/4.3 wt % thiourea (analytically pure) was pre-cooled to −4.8° C., and then 178 g of dry cotton linter cellulose pulp (having a polymerization degree of 440) was added immediately, while stirring under 720 rpm at room temperature for 15 minutes to dissolve the cellulose completely. A transparent cellulose solution was obtained by deaerating under vacuum at 5° C. for 5 hours. The obtained cellulose solution was pressed to pass through a spinneret and entered into a first coagulation bath for solidification, wherein the bath was a mixed aqueous solution of 9.0 wt % $H_2SO_4$/11.2 wt % $Na_2SO_4$ and the bath temperature was 15° C. Subsequently, the cellulose filaments entered into a second coagulation bath for regeneration, wherein the bath was an aqueous solution of 5 wt % $H_2SO_4$ and the bath temperature was 15° C. The stretched and regenerated cellulose filaments were washed with water and entered into a plasticizer tank for oiling, dried by a drying roll, and then wound on a bobbin to form a spindle numbered as 2. The filaments had a round cross-section, soft and glossy appearance, were free of sulfur and possessed excellent mechanical properties (Table 1).

Example 3

3 kg of a mixed aqueous solution of 9.5 wt % NaOH/4.3 wt % thiourea (industrially pure) was pre-cooled to −4.6° C., and then 178 g of dry cotton linter cellulose pulp (having a polymerization degree of 440) was added immediately, while stirring under 720 rpm at room temperature for 15 minutes to dissolve the cellulose completely. A transparent cellulose solution was obtained by deaerating under vacuum at 5° C. for 5 hours. The obtained cellulose solution was pressed to pass through a spinneret and entered into a first coagulation bath for solidification, wherein the bath was a mixed aqueous solution of 12.2 wt % $H_2SO_4$/13.6 wt % $Na_2SO_4$ and the bath temperature was 12.2° C. Subsequently, the cellulose filaments entered into a second coagulation bath for regeneration, wherein the bath was an aqueous solution of 5 wt % $H_2SO_4$ and the bath temperature was 13.6° C. The stretched and regenerated cellulose filaments were washed with water and entered into a plasticizer tank for oiling, dried by a drying roll, and then wound on a bobbin to form a spindle numbered as 3. The filaments had a round cross-section, soft and glossy appearance, were free of sulfur and possessed excellent mechanical properties (Table 1).

The mechanical properties of the cellulose filaments obtained in the above examples were measured by XQ-1 constant-speed elongation type fiber strength tester. Their breaking strength and elongation at break in dry state were summarized in Table 1.

TABLE 1

Test results of mechanical properties -- breaking strength and elongation at break -- of cellulose filaments

| No. | Concentration of cellulose (wt %) | Polymerization degree of cellulose | Grade of chemical reagents | Tensile strength (cN/dtex) | Elongation at break (%) |
|---|---|---|---|---|---|
| 1 | 4.8 | 620 | Analytical grade | 1.4 | 5 |
| 2 | 5.6 | 440 | Analytical grade | 2.2 | 2 |
| 3 | 5.6 | 440 | Industrial grade | 2.0 | 2 |

Example 4

126 g of dry cotton linter cellulose pulp (having a polymerization degree of 620) was added into 3 kg of a mixed aqueous solution of 6 wt % NaOH/5 wt % thiourea (chemically pure), mixed homogenously and frozen (−6° C.~−10° C.) to form a solid, then thawed and agitated at room temperature until the cellulose was dissolved completely to obtain a solution I (having a cellulose weight concentration of 4%). 25 g of chitin (having a viscosity-average molecular weight of $1.4 \times 10^6$ and an acetylation degree of 73%) was immersed in 0.4 L of 46 wt % NaOH solution in ice bath condition for 6 hours, and ice-cakes were gradually added to obtain a chitin solution II having a weight concentration of 2%. The solution I and the solution II were mixed in a ratio (weight ratio) of 2:1 under stirring to obtain a spinning solution, which was deaerated by standing under vacuum at 5° C. for 12 hours to form a transparent solution. This concentrated cellulose-chitin solution was pressed to pass through a spinneret, and entered into a first coagulation bath for solidification, wherein the bath was a mixed aqueous solution of 15 wt % $H_2SO_4$/10 wt % $Na_2SO_4$ and the bath temperature was 10° C. Subsequently, the cellulose filaments entered into a second coagulation bath for regeneration, wherein the bath was an aqueous solution of 5 wt % $H_2SO_4$ and the bath temperature was 10° C. The stretched and regenerated cellulose filaments were washed with water and entered into a plasticizer tank for oiling, dried by a drying roll, and then wound on a bobbin to form a spindle numbered as 4. The chitin/cellulose filaments were free of sulfur, and had a round cross-section, a soft and glossy appearance, and relatively high absorption capacity for metal ions.

Example 5

126 g of dry cotton linter cellulose pulp (having a polymerization degree of 620) was added into 3 kg of a mixed aqueous solution of 6 wt % NaOH/5 wt % thiourea (chemically pure), mixed homogenously and frozen (−6° C.) to form a solid, then thawed and agitated at room temperature until the cellulose was dissolved completely to obtain a solution I (having a cellulose weight concentration of 4%). 100 g of soybean protein isolate (SPI) was dissolved at room temperature into 900 g of a mixed aqueous solution of 6 wt % NaOH/5 wt % thiourea (chemically pure) to obtain a solution II (having a SPI weight concentration of 10%). The solution I and the solution II were mixed in a cellulose/SPI weight ratio of 9:1 at room temperature and stirred for 0.5 hours, and then deaerated by standing under vacuum at 5° C. for 5 hours to obtain a spinning solution. This mixed cellulose-soybean protein solution was pressed to pass through a spinneret, and entered into a first coagulation bath for solidification, wherein the bath was a mixed aqueous solution of 9.0 wt % $H_2SO_4$/11.2 wt % $Na_2SO_4$ and the bath temperature was 15° C. Subsequently, the cellulose filaments entered into a second coagulation bath for regeneration, wherein the bath was an aqueous solution of 5 wt % $H_2SO_4$ and the bath temperature was 15° C. The stretched and regenerated cellulose filaments were washed with water and entered into a plasticizer tank for oiling, dried by a drying roll, and then wound on a bobbin to form a spindle numbered as 5. The soybean protein/cellulose filaments were free of sulfur, and possessed biocompatibility and a function of promoting cell growth.

Example 6

3 kg of a mixed aqueous solution of 9.5 wt % NaOH/4.3 wt % thiourea (industrially pure) was pre-cooled to −6° C., and then 178 g of dry cotton linter cellulose pulp (having a polymerization degree of 440) was added immediately, while stirring under 720 rpm at room temperature for 15 minutes to dissolve cellulose completely. 18 g of tourmaline nano-crystals were dispersed in 120 g of a mixed aqueous solution of 9.5 wt % NaOH/4.3 wt % thiourea (industrially pure) and agitated for 8 hours to form a suspension of tourmaline. The pre-dispersed tourmaline suspension was added dropwise into a round bottom flask charged with the cellulose solution, and then the system was closed and agitated vigorously at 0° C. in ice-water bath under ultrasonic environment to obtain a uniformly mixed liquid. A transparent cellulose solution was obtained by deaerating under vacuum at 5° C. for 5 hours. The obtained cellulose solution was pressed to pass through a spinneret, and entered into a first coagulation bath for solidification, wherein the bath was an aqueous solution of 5 wt % $CaCl_2$ and the bath temperature was 20° C. Subsequently, the cellulose filaments entered into a second coagulation bath for regeneration, wherein the bath was an aqueous solution of 3 wt % hydrochloric acid and the bath temperature was 20° C. The stretched and regenerated cellulose filaments were washed with water and entered into a plasticizer tank for oiling, dried by a drying roll, and then wound on a bobbin to form a spindle numbered as 6. The nano-crystal/cellulose filaments were free of sulfur and had significant effects against *staphylococcus aureus*.

It should be understood that all value ranges in the description and claims are intended to include their end values and all subranges within these ranges.

Although the present invention is illustrated and described with reference to the illustrative examples, those skilled in the art would understand that the present invention could be varied in manners and details without departing from the spirit and scope of the present invention. The protection scope of the present invention is defined as claimed in the appended claims.

What is claimed is:

1. A method for pilot-scale production of cellulose products, comprising:
    (a) pre-cooling a mixed aqueous solution of sodium hydroxide and thiourea to a first temperature;
    (b) placing the pre-cooled mixed aqueous solution at a second temperature, and then immediately adding a cellulose raw material and dissolving under sufficient agitation to obtain a cellulose solution;
    (c) filtering and deaerating said cellulose solution;
    (d) using a molding device for pilot-scale production to process the filtered and deaerated cellulose solution to form a cellulose product, said molding device being a two-step coagulation bath spinning device,
    wherein said two-step coagulation bath spinning device comprises a first coagulation bath and a second coagulation bath, wherein said first coagulation bath is a mixed aqueous solution of $H_2SO_4$ and $Na_2SO_4$, wherein the concentration of $H_2SO_4$ is 5 wt % to 20 wt %, and the concentration of $Na_2SO_4$ is 5 wt % to 25 wt %, and the bath temperature is 0 to 40° C., and said second coagulation bath is an aqueous solution of 3 wt % to 20 wt % $H_2SO_4$, and the bath temperature is 0 to 50° C.

2. The method according to claim 1, wherein between the step (b) and the step (c), the method further comprises a step for mixing the cellulose solution with other substances, wherein said other substances is selected from a group comprising proteins, chitins, Konjac Glucomannans and nano-crystal particles.

3. The method according to claim 2, wherein said mixed aqueous solution of sodium hydroxide/thiourea, the concentration of sodium hydroxide is 9.0 wt % to 10.0 wt %, and the concentration of thiourea is 4.0 wt % to 6.0 wt %.

4. The method according to claim 1, wherein said first temperature is −10° C. to 5° C.; and said second temperature is 0° C. to 25° C.

5. The method according to claim 1, wherein after the cellulose raw material is added at said second temperature, the agitation is performed for 5 minutes or more.

6. The method according to claim 1, wherein said cellulose solution is jetted from a spinneret into the first coagulation bath for solidification, partial stretch orientation and draft, and then enters into the second coagulation bath for further regeneration and stretch orientation, and is subjected to water washing, plasticizing, drying and winding successively to obtain regenerated cellulose filaments, wherein the spinneret is vertical spinneret or horizontal spinneret.

7. The method according to claim 1, wherein said cellulose products are in the form of filaments, chopped fibers, chromatographic packings and/or nonwovens.

8. The method according to claim 1, wherein, in said mixed aqueous solution of sodium hydroxide/thiourea, the concentration of sodium hydroxide is 8.1 wt %-12.0 wt % and the concentration of thiourea is 3.0 wt %-6.0 wt %.

9. The method according to claim 1, wherein, in said mixed aqueous solution of sodium hydroxide/thiourea, the concentration of sodium hydroxide is 9.5 wt % and the concentration of thiourea is 4.3 wt %.

10. The method according to claim 1, wherein said first temperature is −8° C. to 0° C. and said second temperature is 5° C.-20° C.

11. The method according to claim 1, wherein said first temperature is −6° C. to −3° C. and said second temperature is 10° C.

12. The method according to claim 1, wherein the agitation is performed for 10 minutes or more.

13. The method according to claim 1, wherein the agitation is performed for 15 minutes or more.

14. The method according to claim 1, wherein, in said first coagulation bath, the concentration of $H_2SO_4$ is 8 wt %-16 wt %, the concentration of $Na_2SO_4$ is 8 wt %-20 wt %, and the bath temperature is 5° C.-30° C.; and said second coagulation bath is an aqueous solution of 5 wt %-10 wt % $H_2SO_4$, and the bath temperature is 10° C.-30° C.

15. The method according to claim 1, wherein, in said first coagulation bath, the concentration of $H_2SO_4$ is 9 wt %-13 wt %, and the concentration of $Na_2SO_4$ is 10 wt %-15 wt %, and the bath temperature is 10° C.-15° C.; and said second coagulation bath is an aqueous solution of 5 wt % $H_2SO_4$, and the bath temperature is 10° C.-20° C.

* * * * *

UNITED STATES PATENT AND TRADEMARK OFFICE
CERTIFICATE OF CORRECTION

PATENT NO.         : 7,981,337 B2                                     Page 1 of 1
APPLICATION NO.    : 12/088686
DATED              : July 19, 2011
INVENTOR(S)        : Zhang et al.

It is certified that error appears in the above-identified patent and that said Letters Patent is hereby corrected as shown below:

Title page item 75
    Add "Chuntao Li, Hai'An (CN)"

Signed and Sealed this
Eleventh Day of October, 2011

David J. Kappos
*Director of the United States Patent and Trademark Office*